United States Patent [19]
Pyhälammi

[11] Patent Number: 5,541,922
[45] Date of Patent: Jul. 30, 1996

[54] METHOD FOR ASSIGNING PRIORITY TO TRAFFIC BETWEEN LOCAL AREA NETWORKS INTERCONNECTED VIA A BACKBONE NETWORK

[75] Inventor: Seppo Pyhälammi, Helsinki, Finland

[73] Assignee: Nokia Telecommunications OY, Espoo, Finland

[21] Appl. No.: 411,679

[22] PCT Filed: Oct. 1, 1993

[86] PCT No.: PCT/FI93/00393

§ 371 Date: Apr. 4, 1995

§ 102(e) Date: Apr. 4, 1995

[87] PCT Pub. No.: WO94/08411

PCT Pub. Date: Apr. 14, 1994

[30] Foreign Application Priority Data

Oct. 5, 1992 [FI] Finland ..................................... 924482

[51] Int. Cl.⁶ .................................................. H04L 12/66
[52] U.S. Cl. .......................... 370/82; 370/85.6; 370/85.13
[58] Field of Search ........................... 370/61, 85.3, 85.6, 370/85.13, 94.1, 108, 82

[56] References Cited

U.S. PATENT DOCUMENTS

| | | | |
|---|---|---|---|
| 5,060,228 | 10/1991 | Tsutsui et al. | 370/85.13 |
| 5,088,090 | 2/1992 | Yacoby | 370/85.13 |
| 5,144,622 | 9/1992 | Takiyasu et al. | 370/85.13 |
| 5,168,495 | 12/1992 | Smith | 370/85.6 |
| 5,224,099 | 6/1993 | Corbalis et al. | 370/85.7 |
| 5,379,292 | 1/1995 | Kurata et al. | 370/85.6 |
| 5,388,089 | 2/1995 | Odaka et al. | 370/61 |
| 5,390,176 | 2/1995 | Schoute et al. | 370/61 |

OTHER PUBLICATIONS

Leena Jaakonmäki, LÄHIVERKKO–OPAS, 1991, pp. 17–23.
Grimshaw, "LAN Interconnections Technology", TELECOMMUNICATIONS, Feb. 1991, pp. 25–32.
Minoli, "An Overview of Frame Relay Technology" DATAPRO MANAEGMENT OF DATA COMMUNICATIONS, System Design, pp. CS25–200–101 to CS25–100–116.

Primary Examiner—Benedict V. Safourek
Attorney, Agent, or Firm—Cushman, Darby & Cushman, L.L.P.

[57] ABSTRACT

A method for assigning priority to traffic between LANs interconnected via a backbone network and connected to the backbone network over a transmission line. To be able to control the maximum delays, especially with traffic having a high interactivity requirement, (a) the length of a frame received from the LAN is determined with a predetermined accuracy, thus obtaining at least two length categories having a respective priority status; (b) at least one address of a pair of addresses formed by the source and destination address of the received frame is compared with the corresponding addresses of frames currently waiting for transmission in a queue of frames with a lower priority status than the priority status corresponding to the length of the received frame, or frames which have been in the queue during a predetermined preceding period of time (Tp); (c) frames to be forwarded are applied to at least two different transmission queues with different priority status on the basis of the classification into length categories and the address checking; (d) at least some of the frames to be transmitted are marked so as to distinguish the priority frames from the other frames; and (e) the marking is checked at a buffering point, and the frames are forwarded in accordance with the marked priority status.

8 Claims, 5 Drawing Sheets

METHOD FOR ASSIGNING PRIORITY TO TRAFFIC BETWEEN LOCAL AREA NETWORKS INTERCONNECTED VIA A BACKBONE NETWORK

BACKGROUND OF THE INVENTION

The invention relates to a method for assigning priorities to traffic between local area networks interconnected via a backbone network.

A local area network (LAN) is a local data network taking care of traffic between workstations connected to it, such as PCs, and various devices providing services to the workstations. A basic LAN configuration comprises a physical transmission path, i.e. cabling, a network server, workstations connected to the cabling by means of adapter cards, and a network software. A LAN is typically located in a single building or in several buildings located close to each other, e.g. at one office of a specific organization or company. Recently, however, there has been an increased demand to interconnect individual LANs into larger networks. For such purposes, the above-described basic components will not suffice.

Equipments required to interconnect LANs are typically classified in accordance with the OSI (Open Systems Interconnection) model of the ISO (International Standards Organization). The OSI model aims at creating a framework for standards applied in data transmission between open systems. The model comprises seven superimposed layers the tasks of which have been specified whereas their implementation has been left open. The OSI model is described more closely, e.g. in Reference [1] (the references are listed at the end of this specification).

The devices used in the interconnection of LANs, i.e. the repeater, the bridge, and the router, will be described briefly hereinbelow.

The repeater is the simplest means used in the interconnection of LANs or LAN segments. The repeater operates on the lowest OSI layer (layer 1), i.e. on the physical layer. The repeater amplifies the bit stream and forwards all traffic over it from one network segment to another. The repeater is thus used to increase the physical length of the network, and it can be used only when the networks to be interconnected are fully identical (or differ only in the transmission medium). Segments interconnected by the repeater form a single logical network.

The bridge operates on the next OSI layer (layer 2), i.e. on the data link layer. Even though the data link layer is mainly independent of the physical transmission medium used, some of its functions are dependent on the physical transmission medium. For this reason, the data link layer includes a so-called MAC (Media Access Control) sublayer in some network architectures. The MAC sublayer provides access to the transmission path, i.e. it takes care of functions most probably associated with the characteristics of the physical transmission path. Bridges typically operate on the MAC sublayer. The function of the bridge is to monitor frames transferred over the LAN and to transfer them from one network to another on the basis of the physical address of the data packets. Only frames having a destination address indicating transmission to the side of the other network are able to cross the bridge. The bridge thus acts as an insulator which reduces the load in other network portions. The bridge does not analyze more closely what the frames transport, and it ignores the higher-level protocol transferred in the frame. In other words, the bridge is protocol-independent, and so it can be used to interconnect networks utilizing protocols of different types (TCP/IP, XNS, OSI, NetBios, etc.).

The bridge contains a so-called routing table, which is updated by the bridge on the basis of the addresses of the transmitting parties of frames received by the bridge. The routing table indicates to the bridge behind which interface a specific station is currently located. In other words, the bridge is able to "learn" station locations so that new stations can be added to the network without having to reconfigure the bridge.

The router operates on the third OSI layer, i.e. on the network layer. Routers know the higher protocols used in the LAN traffic and route messages by means of the addressing mechanisms of these protocols. The router forwards the frame (to another router or to a destination station) on the basis of the data obtained from the network address routing table. The router calculates an optimal route for each frame. The maintenance of routing data and the route selection are based on a routing protocol utilized by the router (such as RIP, Routing Information Protocol). The filtering and management properties of routers are superior to those of bridges, and they offer better possibilities for the construction and use of complicated LAN configurations.

The bridge and the router are described, e.g. in Reference [2], which is referred to for a more detailed description.

A packet switched network solution (i.e. a network over which packets of varying length are transmitted) requires matching of rates as the subscriber interfaces usually operate at different rates due to their different data transmission capacity requirements. There also often occur different rates over data links between network nodes. Rate/matching is usually performed by buffering which should not cause an excessive absolute delay in order that the applications utilizing the link would be satisfied with the data transmission service.

At present, traffic between LANs can be considered to consist of traffic of two types: terminal user traffic and datafile transfer traffic. Terminal traffic has a high interactivity requirement (a delay of 2 to 300 ms over the link in both directions) as it provides services directly to LAN users (who very often are less patient). On the contrary, the transfer of datafiles mainly consists of interequipment transfer traffic in which the required delays are not particularly critical (the delays may be several seconds).

FIG. 1 shows a public network service in which local area networks 11 of different offices A–E of one specific company are interconnected via a public network 12 acting as a backbone network. The public network 12 is any network known per se which is able to forward LAN data packets of varying length, such as a FR (Frame Relay) network. The different offices typically have different interface rates due to their different data transmission requirements, resulting from size differences between the offices. The LAN of each office is adapted to the FR service via a bridge 13 located at the office and a transmission line. The transmission lines are indicated with the references 14a–14e, respectively. Such interconnection is described in more detail in Pyhälammi et al, U.S. patent application Ser. No. 08/416,682, filed Apr. 5, 1995, which is referred to for a more detailed description.

The link between the offices A and B will be described by way of example below. The office B transmits first a packet burst to the office A. As the office LAN operates at a high rate (e.g. 10 Mbit/s), rate/matching is required for the subscriber line 14b having a capacity of 64 kbit/s in this example (FIG. 2). The matching is performed by the bridge 13 located within the premises of the office B, by buffering the packets and forwarding them at an access rate to the network 12. Busses within the network 12 have a higher capacity than the subscriber lines, and so there is no need for buffering there. In this case, the rate of the subscriber line of the office A (2 Mbit/s) is also higher than that of the office B, so that the office A is able to receive the packets at the rate at which they were transmitted from the office B.

Problems occur when the situation is reversed, i.e. when the rate of the transmitting interface is higher than that of the receiving interface (e.g. traffic from the head office to a branch office). In such a case, the entire packet burst passes from the subscriber interface A over the network 12 to the edge of the network, and further to the interface of the office B, where the packets have to be buffered to wait for access to the subscriber line. This situation is illustrated in FIG. 2, where a buffering point is indicated by the reference P and a buffer by the reference numeral 21. In practice, the problem is not the buffering, as such, but the delay caused by the buffering as the delay disturbs the interactive work. For instance, if the access rate is 64 kbit/s, the delay of a single packet of one kilobyte will be 125 ms. If a plurality of such packets are transmitted concurrently, as usual, the delay will be intolerable for the interactive operation. This is because if a packet requiring a rapid response is received after this kind of packet burst, it has to wait in a queue for the buffer 21 to be emptied.

SUMMARY OF THE INVENTION

The object of the present invention is to eliminate the above-described drawback and to provide a method for assigning priority to traffic requiring a rapid response over other kind of traffic in the above-described case. This is achieved by a method according to the invention which is characterized in that the length of a frame received from the local area network is determined with a predetermined accuracy, thus obtaining at least two length categories having a respective priority status; at least one address of a pair of addresses formed by the source and destination address of the received frame is compared with the corresponding addresses of frames currently waiting for transmission in a queue of frames having a lower priority status than the priority status corresponding to the length of said received frame, or frames which have been in said queue during a predetermined preceding period of time; frames to be forwarded are applied into at least two different transmission queues with different priority statuses on the basis of the classification into the length categories and on the basis of the address checking; at least some of the frames to be transmitted are marked so that the priority frames are distinguishable from the other frames; and said marking is checked at said point requiring buffering and the frames are forwarded in accordance with the priority status indicated by the marking.

One aspect of the invention is to classify the frames to be transmitted into different priority categories according to their length and to indicate the priority category of the frame so that frames indicated to have priority will be forwarded more rapidly at subsequent buffering points. Another aspect of the invention is to ensure that the order of frames transmitted from the same transmitting party to the same receiving party will not change.

The solution according to the invention allows a considerable reduction to be achieved in delays created over the subscriber lines. In practice, this improvement may readily result in that the delay is reduced to one/tenth of the previous value.

BRIEF DESCRIPTION OF THE DRAWINGS

In the following, the invention will be described in more detail with reference to FIGS. 3 to 6 in the examples shown in the attached drawings, in which.

DETAILED DESCRIPTION

Figure 1:
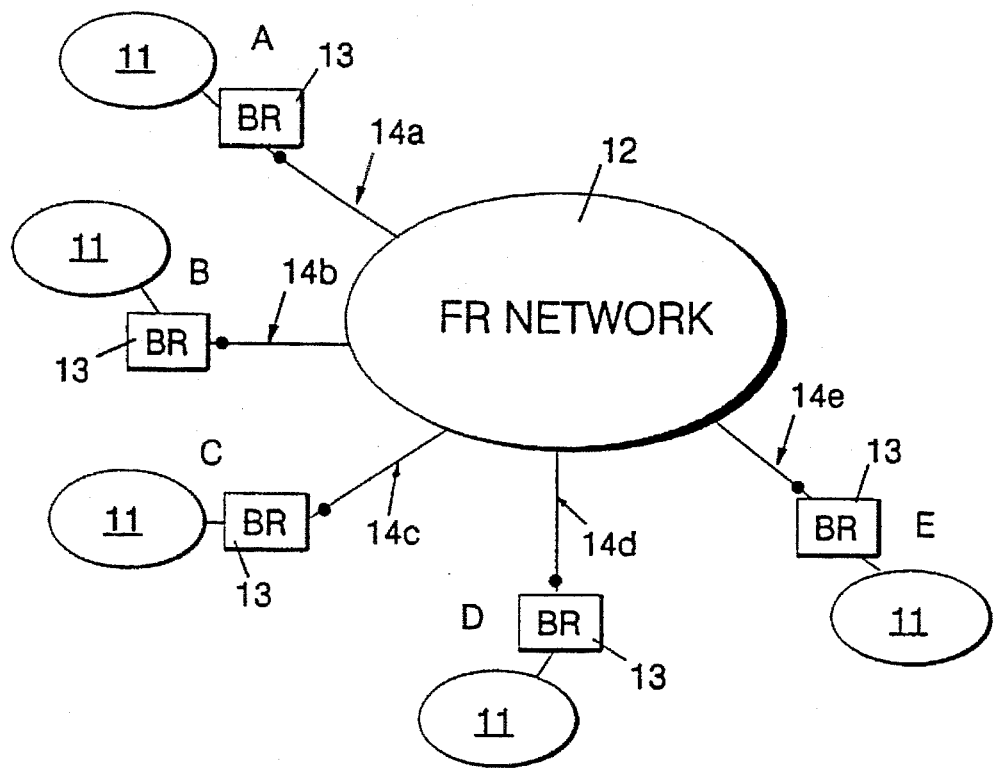
FIG. 1 illustrates a public network service in which the LANs of the different offices of the same company are interconnected via a public network acting as a backbone network.
Figure 2:
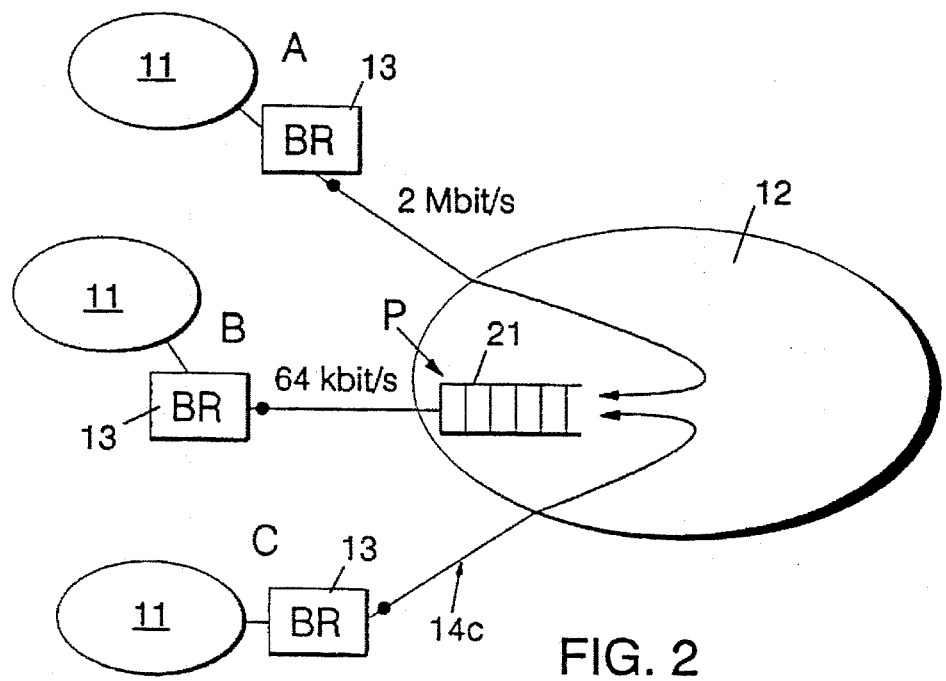
FIG. 2 is a more detailed view of buffering carried out in the arrangement shown in FIG. 1.
Figure 3:
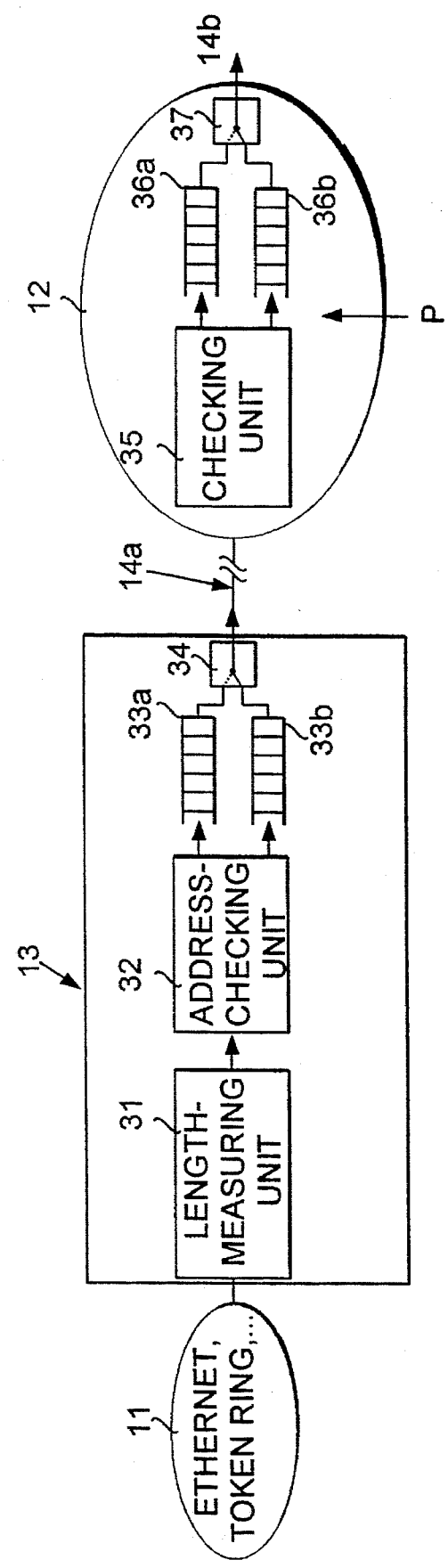
FIG. 3 is a block diagram illustrating an equipment according to the invention.

FIG. 3 shows the arrangement according to the invention for assigning priority to traffic. A LAN 11 of an office A is connected to a subscriber line 14a by a bridge 13 assigning priorities to terminal traffic. The priority/assigning bridge 13 corresponds to a conventional LAN bridge with the exception that it further comprises means for classifying frames to be forwarded according to their length, into two categories; means for analyzing the source and destination addresses of the frame to be bridged; two buffers for buffering frames on the basis of the length classification and address/checking, into a queue of priority frames and a queue of non-priority frames; and means for marking the frames so that the priority frames are distinguishable from the other frames.

The limit value used in the frame/length classification may be, e.g., 200 bytes. This means that frames having a length of or below 200 bytes probably represent (interactive) terminal traffic, while those having a length above 200 bytes probably represent (less interactive) datafile transfer traffic. A frame from the LAN, which is to be bridged, is received by the bridge 13 in its length measuring unit 31, where the frame/length classification takes place by reading the length of the frame from the frame length field (e.g. from the LENGTH field in an Ethernet frame).

In order to ensure that the mutual order of packets transmitted from the same source address to the same destination address will not change, an address/checking unit 32 is added after the length/measuring unit. The address/checking unit has two outputs: a buffer 33a for priority frames is connected to one output and a buffer 33b for non-priority frames is connected to the other output. Priority over the other frames is assigned to a frame classified as short if there is not or has not been for a predetermined period of time Tp a frame which has no priority and which is to be transmitted or has been transmitted from the same transmitting party to the same receiving party as the frame classified as short. The buffers are connected to a switching means 34, which forwards the frames to the output of the bridge (the transmission line 14a), so that the priority frames in the buffer 33a are processed prior to the non-priority frames in the buffer 33b.

Figure 3A:
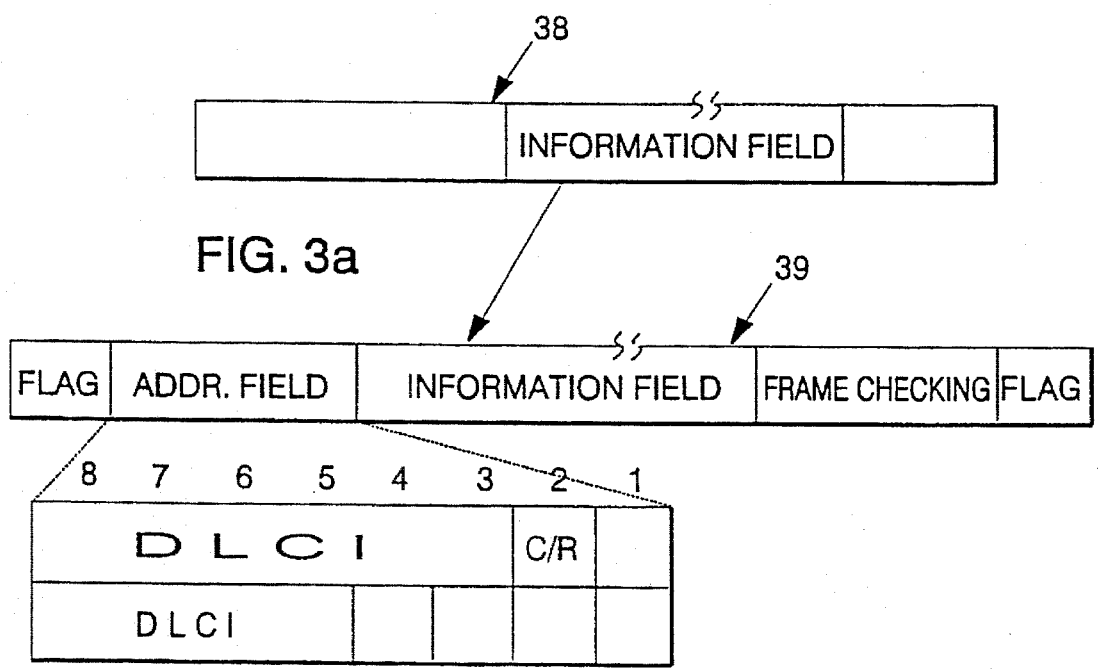
FIG. 3a illustrates a frame used in a public FR network, and the insertion of a LAN frame into a FR frame.

For the sake of clarity, only portions essential to the invention are shown in FIG. 3. In other respects, the bridge 13 corresponds to the prior art technique. Bridges are typically classified on the basis of the routing algorithms they utilize. An essential feature of the bridge is, however, that it comprises two LAN interfaces and means for analyzing the physical address of the frame (the OSI layer 2). It is further to be noted that the method according to the invention is applied only to LAN frames which the bridge has authenticated and the destination address of which refers to a network or network portion on the other side of the bridge. In addition, it is to be noted that a frame received from the LAN (such as an Ethernet frame) is inserted into the information field of the FR frame in the bridge (with the exception of timing bits and other similar bits) prior to the buffering of the frames, and the completed FR frames are buffered into the buffers 33a and 33b. FIG. 3a shows, first, the insertion of a LAN frame 38 into the information field of an FR frame 39, and, second, a typical frame configuration of the FR network, in which the address field preceding the information field consists of two octets (bits 1 to 8), the bit No 2 of the first octet being a C/R bit (0 or 1). The logical address (DLCI) comprises the bits 3 to 8 of the first octet and the bits 5 to 8 of the second octet. The significance of the C/R bit and the logical address in the method according to the invention will be described more closely below. The FR network and its frame configuration are described in more detail in Reference [3], which is referred to for a more detailed description.

A bridge of the same type is disclosed in Pyhälammi et al, U.S. patent application Ser. No. 08/416,682, filed Apr. 5, 1995, which describes more closely, e.g., the typical LAN traffic profile, on the basis of which the limit value used in the frame length classification is selected.

Figure 4:
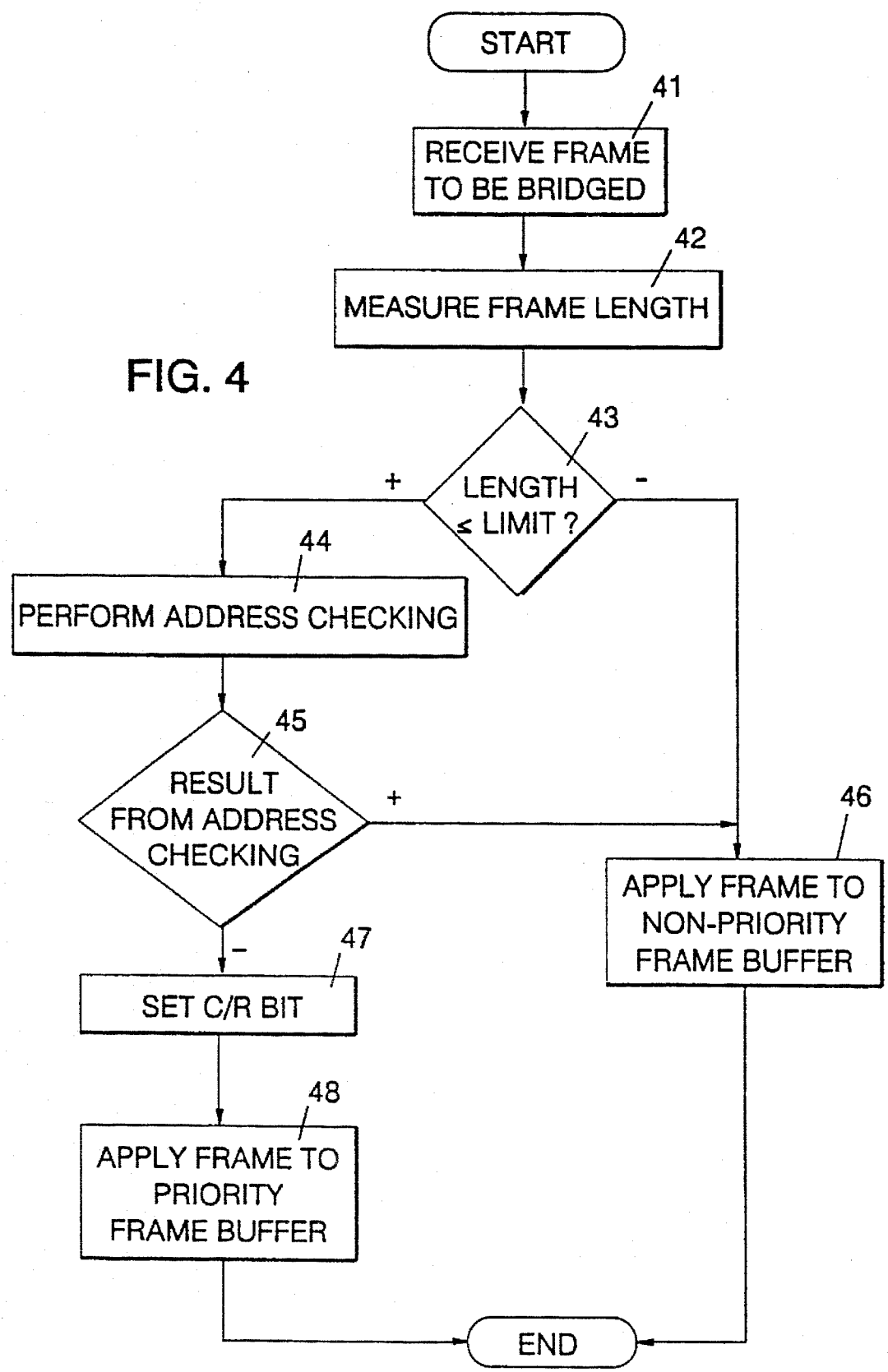
FIG. 4 is a flow diagram illustrating the priority assignment performed at the transmission end in the method according to the invention.

FIG. 4 is a flow diagram illustrating the assignment of priorities by the bridge 13. In step 41, a frame to be bridged is received in the length measuring unit 31, which reads the length from the respective field of the frame (step 42). The obtained length is compared with a predetermined limit value (such as 200 bytes) in step 43. If the obtained length is equal to or smaller than the limit value, the frame is applied to the address/checking unit 32, where the addresses contained in the frame are checked (step 44). If it is found (step 45) that the result of the address/checking is positive, the FR frame is applied from the address/checking unit to the non-priority frame buffer 33b (step 46). If the result of the address/checking is negative, the C/R bit of the FR frame is set to a predetermined value (step 47), and the frame is applied from the address/checking unit to the priority frame buffer 33a (step 48). (The C/R (Common/Response) bit, already referred to in relation to FIG. 3a, is intended to be utilized by an application program, whereby it may also be used for the priority assignment according to the invention.)

On the other hand, if it is found in step 43 that the frame length exceeds the predetermined limit value, the frame is applied directly through the address/checking unit (without address/checking) to the non-priority frame buffer 33b. The LAN frame is, however, transformed into an FR frame used in the public network before it is applied to the buffer.

Figure 5:
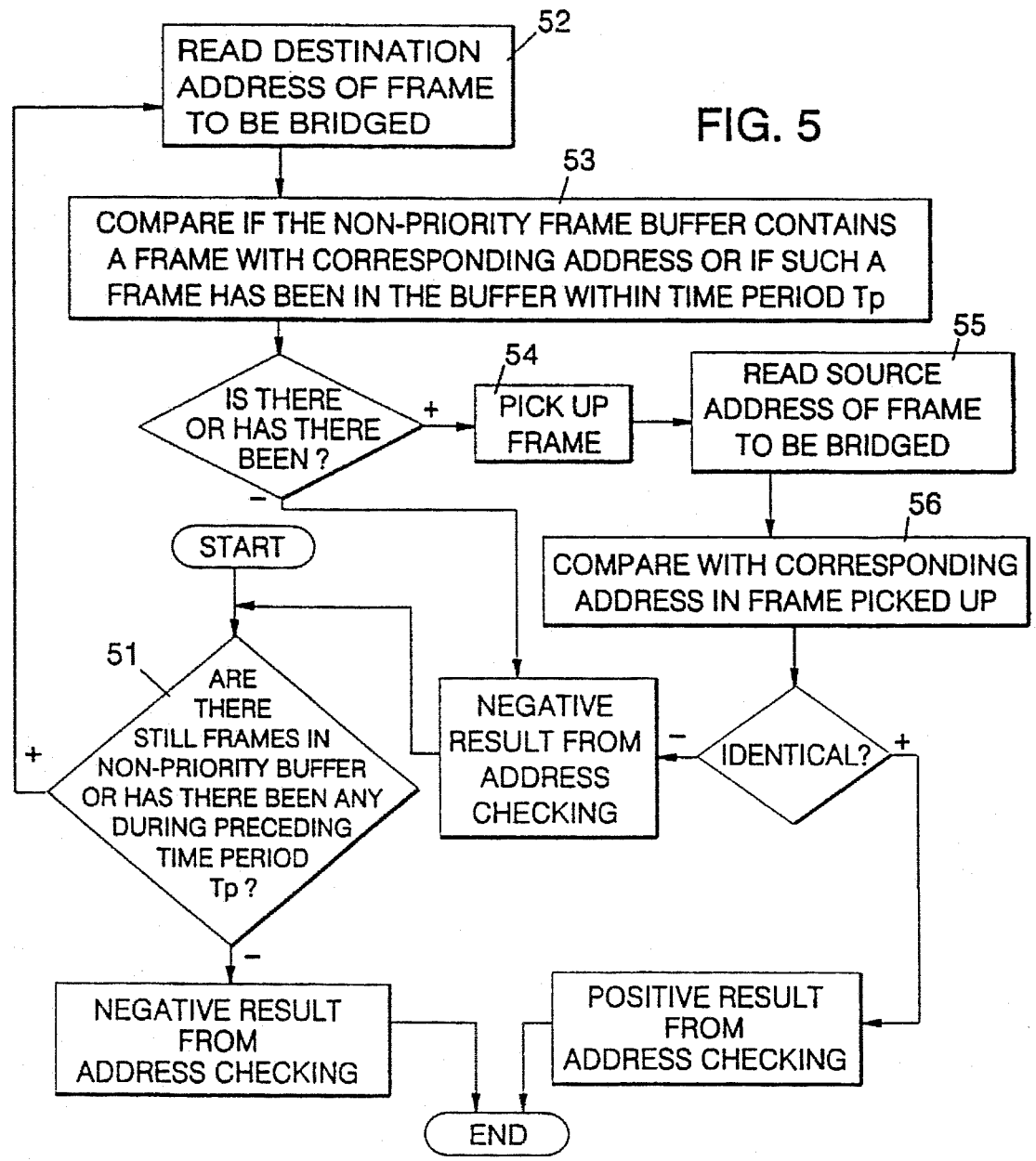
FIG. 5 is a block diagram illustrating the address checking operation contained in the priority operation performed at the transmission end.

The above-described address/checking for short frames will be described more closely with reference to the block diagram of FIG. 5, which illustrates the operation of the address/checking unit 32. At the start (step 51), it is checked whether there are frames queuing in the non-priority frame buffer 33b, or whether there has been such frames during a preceding period of time Tp. If neither one of the conditions is fulfilled, the result of the address/checking is negative, and the C/R bit of the FR frame is set to a predetermined state, and the FR frame is fed to the priority frame buffer 33a, as described above. If there are still frames in the queue of non-priority frames, or there has been frames during the period of time Tp, the address (destination address) of the receiving party of the frame to be bridged is read in step 52, whereafter the address is compared with the corresponding address of a frame in the queue of non-priority frames, or a frame which has been in the queue during the period of time Tp (step 53). If the addresses are identical, the preceding frame is picked up (step 54), and the address of the transmitting party (source address) is also read from the frame to be bridged. This address is compared with the corresponding address of the address picked up (step 56). If these addresses are also identical, the result of the address/checking is positive, and the respective FR frame is fed into the non-priority frame buffer 33b, as described above. If the comparisons in steps 53 or 56 show that either the source addresses or destination addresses deviate from each other, the result of the address/checking is negative, and the C/R bit of the FR frame is set and the FR frame is fed to the priority frame buffer 33a, as described above. One then returns to the start, and the processing is continued for the next frame in the queue of non-priority frames or a frame which has been in the queue during the period of time Tp, if there are any such frames left.

Accordingly, short frames are fed mainly to the priority frame buffer 33a. However, if the non-priority frame buffer already contains a frame in which the pair of the source and destination address corresponds to the pair of the source and destination address of the short frame, the short frame is fed to the non-priority frame buffer. In this way, it can be ensured that the order of packets sent from the same transmitting party to the same receiving party will not change at the transmission end. If there is no such frame in the non-priority frame buffer but there has, however, been such a frame during the preceding period of time Tp, the short frame is nevertheless fed to the non-priority frame buffer. By checking the predetermined preceding period of time Tp, it is ensured that the frames will not be disordered when they are transferred at the buffering point P from the public network 12 to the transmission line 14b. The length of the period of time Tp corresponds to the length of the buffer 21 (and a buffer 36b).

As shown in FIG. 3, the subscriber interface of the office B comprises a checking unit 35 having one output connected to the priority frame buffer 36a and another output connected to the non-priority frame buffer 36b. The buffers are connected to a switching means 37, which forwards the frames to the transmission line 14b so that the priority frames in the buffer 36a will be transmitted prior to the non-priority frames in the buffer 36b.

Figure 6:
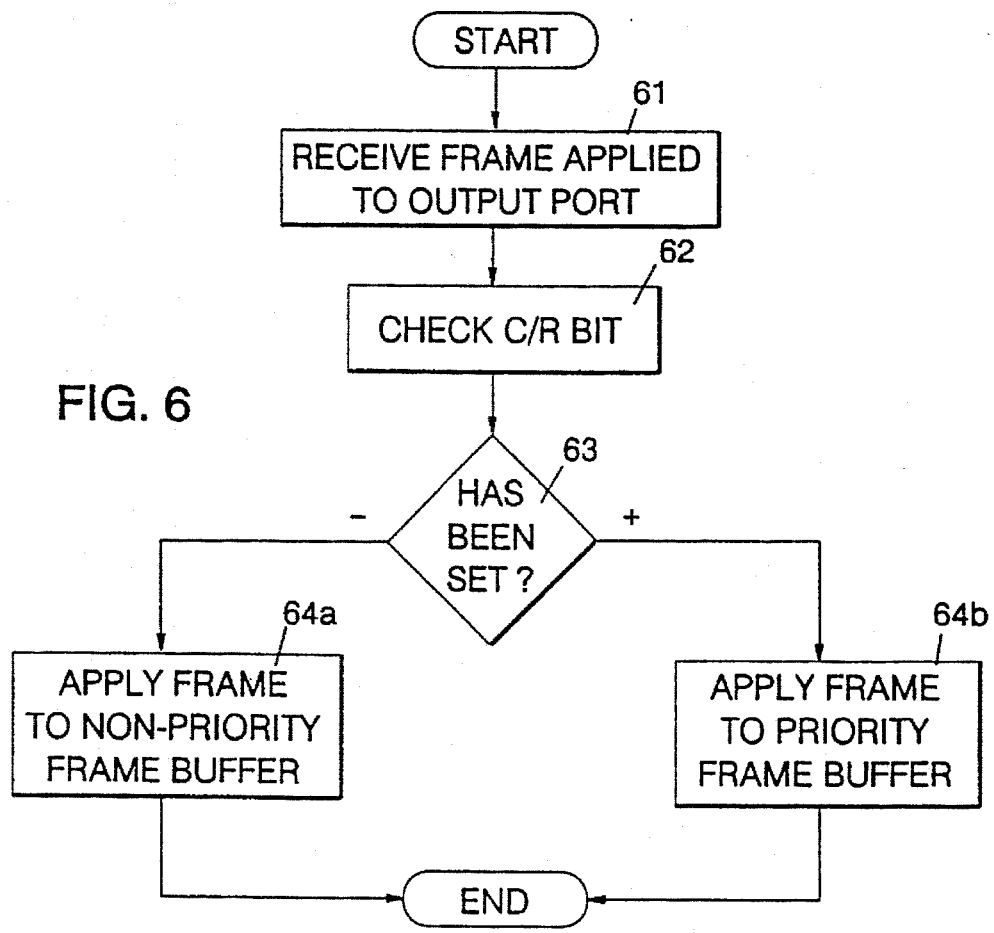
FIG. 6 is a block diagram illustrating the frame classification performed on the side of the public network prior to the subscriber interface.

FIG. 6 illustrates the assignment of priorities by the checking unit 35 at the subscriber interface of the office B at the edge of the public network (in a network node). In step 61, the checking unit receives an FR frame to be transferred to the subscriber line 14b. The received FR frame is subjected to C/R bit/checking (step 62), which is applied to find out whether the bit has been set at the transmission end. If the bit has been set, the frame is fed to the priority frame buffer 36a (step 64b). If the bit has not been set, the frame is fed to the non-priority frame buffer 36b (step 64a).

In the bridge at the reception end (in this case in the bridge of the office B), the frame used by the LAN 11 (e.g. the Ethernet frame) is again derived from the FR frame.

As an alternative to the use of the C/R bit of the FR frame, the priority and non-priority frames can be distinguished from each other by assigning separate logical channels for them, for instance, a logical channel 3 for the priority frames and a logical channel 4 for the non-priority frames. The logical channel is indicated by the DLCI (Data Link Connection Identifier) bits of the address field of the FR frame, illustrated in FIG. 3a and also described in Reference [3]. At the reception end, the logical channel is processed in the same way as the C/R bit for distinguishing the priority frames from the non-priority frames.

Even though the invention has been described above with reference to the examples shown in the attached drawings, it is obvious that the invention is not restricted to them, but can be modified within the scope of the inventive idea disclosed above and in the attached claims. For instance, the priority procedure of short frames may also be applied elsewhere than at the edge of the public network. In such cases, the monitoring time Tp at the transmission end has to be dimensioned on the basis of the maximum delay of the entire network.

As the maximum delay of the network and the delay variation can be brought under control by the method according to the invention, it is possible to transmit, e.g., small-scale speech traffic or video information over the network. The speech channel or speech channel group (or correspondingly video information) is packed into sufficiently short packets, and so the network assigns priority to this traffic. In such a situation the minimum rate of the subscriber interface should be high enough (e.g. 512 kbit/s) in order that the delay would remain small enough. The frames may also be classified into more than two priority categories, e.g. by using the above-described logical channel as a distinguishing criterion.

REFERENCES

[1] Leena Jaakonmäki: Lähiverkko-opas, Suomen Atk-kustannus Oy, 1991.

[2] Michael Grimshaw: *LAN Interconnections Technology*, Telecommunications, February 1991.

[3] *An Overview of Frame Relay Technology*, Datapro Management of Data Communications, McGraw-Hill Incorporated, April 1991.

I claim:

1. A method for assigning priority to traffic between local area networks which are interconnected to one another via a backbone network, over respective transmission lines, wherein data is transmitted from one local network to another in a succession of varied-length frames, each having a source address and a destination address, and data buffering is required in the backbone network at a point where data is to be transmitted over a respective transmission line which has a lower transmission capacity than does said backbone network, said method comprising:

(a) determining at said point the length of each respective frame which is about to be received by the backbone network from each respective local area network, with a predetermined accuracy as to whether said length is at least as along as, or is shorter than a given length, and thus, obtaining frames of at least two different frame-length categories, each at least tentatively having a respective, different frame-priority status, of which at least one is lower than another and at least one is higher than another;

(b) causing each frame having a length which is longer than said given length to have a marking identifying that frame as a lower priority frame and sending that frame into a respective queue for lower priority frames to be transmitted along a respective said transmission line into said backbone network for transmission along another respective said transmission line into another said local area network;

(c) comparing at least one address of a pair of addresses formed by the source and destination address of each respective about to be received frame, with the corresponding at least one address of each frame which remains in, or has been in the respective queue for lower priority frames within a time interval of given length ending at the present, and (i) upon finding correspondence in said at least one address, sending the respective about to be received frame into said respective queue for lower priority frames, but (ii) upon finding a lack of correspondence in said at least one address, causing the respective about to be received frame to have a marking identifying that frame as a higher priority frame, and sending that frame into a respective queue for higher priority frames to be transmitted along a respective said transmission line into said backbone network for transmission along another respective transmission line into another said local area network; and (d) checking on priority of successive leading frames waiting in said queues and forwarding said leading frames from respective said queues into said backbone network based on such checking, giving precedence to leading frames having higher priority over those having lower priority.

2. The method of claim 1, wherein:

in practicing step (c), both source and destination addresses between each pair are compared, and correspondence is found only when the respective two source addresses correspond and the respective two destination addresses correspond.

3. The method of claim 1, wherein:

said time interval of given length corresponds to the maximum length of a respective lowest priority one of said frame buffers.

4. The method of claim 1, wherein:

for each said transmission line having said queues of lower and higher priority, there are a total of two such queues, respectively including a non-priority queue and a high-priority queue.

5. The method of claim 4, wherein:

said backbone network is a frame relay network, and, in practicing step (c)(ii), a C/R bit of a respective FR frame is given a predetermined value, for marking the respective frame as being a higher priority frame.

6. The method of claim 1, wherein:

said backbone network is a frame relay network, and, in practicing step (c)(ii), a logical channel address is given a predetermined value, for marking the respective frame as being a higher priority frame.

7. The method of claim 1, wherein:

at least some of said frames bearing a destination address in common, contain information which is susceptible of being output as speech at the respective destination address.

8. The method of claim 1, wherein:

at least some of said frames bearing a destination address in common, contain information which is susceptible of being output as video at the respective destination address.

\* \* \* \* \*